United States Patent
Merritt

[15] 3,693,946
[45] Sept. 26, 1972

[54] PLASTICATION CONTROL FOR INJECTION MOLDING MACHINES

[72] Inventor: Herbert E. Merritt, Cincinnati, Ohio
[73] Assignee: Cincinnati Milacron Inc., Cincinnati, Ohio
[22] Filed: May 10, 1971
[21] Appl. No.: 141,535

[52] U.S. Cl. ..................259/191, 425/145, 264/40, 425/167
[51] Int. Cl. ..............................................B29f 3/02
[58] Field of Search .259/191; 264/40; 425/135, 145, 425/167, 242, 247, 207, 209

[56] References Cited

UNITED STATES PATENTS

| | | | |
|---|---|---|---|
| 3,002,615 | 10/1961 | Lemelson | ...................425/135 |
| 3,616,495 | 4/1968 | Lemelson | ..............425/167 X |
| 3,492,700 | 2/1970 | Kornmayer | ................425/145 |
| 3,551,947 | 1/1971 | Jenning | ................264/40 UX |
| 3,647,309 | 3/1972 | Thompson | .............425/150 X |

Primary Examiner—Robert D. Baldwin
Assistant Examiner—Michael O. Sutton
Attorney—Howard T. Keiser and Alfred J. Mangels

[57] ABSTRACT

A system for continuously controlling the plastication time and shot size of an injection molding machine to predetermined limits and along a predetermined path of screw axial position versus plastication time. The system includes means for providing a schedule of desired screw positions versus plastication time, a direct indication of actual screw positions, and a comparator to compare the actual and desired screw position for any given plastication time and to provide an error signal representative of the difference between the desired and actual screw positions to control the motor which rotates the screw. The control system also stops the rotation of the screw when the desired shot size is achieved.

5 Claims, 3 Drawing Figures

INVENTOR.
HERBERT E. MERRITT
BY
ATTORNEYS

PLASTICATION CONTROL FOR INJECTION MOLDING MACHINES

BACKGROUND OF THE INVENTION

This invention relates to injection molding machines and more particularly to a control system for injection molding machines whereby the plastication time and shot size are continuously controlled to follow a predetermined schedule.

In the operation of injection molding machines of the reciprocable screw type, the screw is rotated and as the material builds up in front of the screw it forces the screw rearwardly. When a predetermined rearward displacement is achieved rotation of the screw is stopped. At that particular point the volume in front of the screw is substantially the volume of the mold into which the material is to be injected and the screw is urged forwardly as, for example, by means of hydraulic pressure to thereby inject the plasticated material into the mold cavity. Thus the plastication time is a function of the screw rotational speed so that increase in screw speed reduces the plastication time while a decrease in screw speed increases the plastication time.

Although the above-described technique of controlling plastication time and shot size by the rotational speed of the screw is satisfactory for a number of materials, there are some materials of a thermally sensitive nature which will degrade if they are maintained at a high temperature for too long a period of time. An example of such a material is polyvinylchloride (PVC), the properties of which degrade if the material is maintained at a temperature greater than 375 degrees F for more than about 5 minutes. Although the plastication time can be reduced by increasing the rotational speed of the screw, that technique also results in temperature build-up due to increased physical working of the material as it passes along the flights of the screw. It is thus desirable to provide an improved system for controlling the plastication time and shot size of an injection molding machine, particularly where thermally degradable materials are being processed, so that the screw displacement as a function of time follows a predetermined schedule to avoid overheating of the material. It is an object of the present invention to provide such a system and to overcome the difficulties hereinabove described.

SUMMARY OF THE INVENTION

Briefly stated, in accordance with one aspect of the present invention, a control system for controlling the plastication time and shot size of an injection molding machine is provided and includes means for generating a signal proportional to the actual axial position of the screw and also means for providing a schedule of desired screw axial position as a function of plastication time. Means are provided for determining the desired screw axial position for a given plastication time and the latter is compared with actual axial screw position and an error signal proportional thereto is generated. Means responsive to the error signal are provided to correct the rotational speed of the screw so that the screw axial retraction as a function of plastication time follows the predetermined schedule.

DESCRIPTION OF THE PREFERRED EMBODIMENTS

Figure 1:
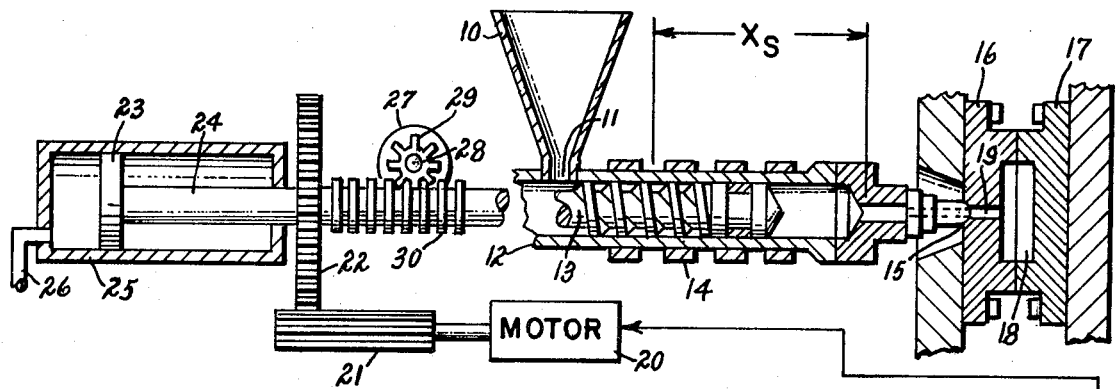
FIG. 1 is a schematic view showing a portion of the plastication system of an injection molding machine to which the control system of the present invention has been applied.
Figure 1:
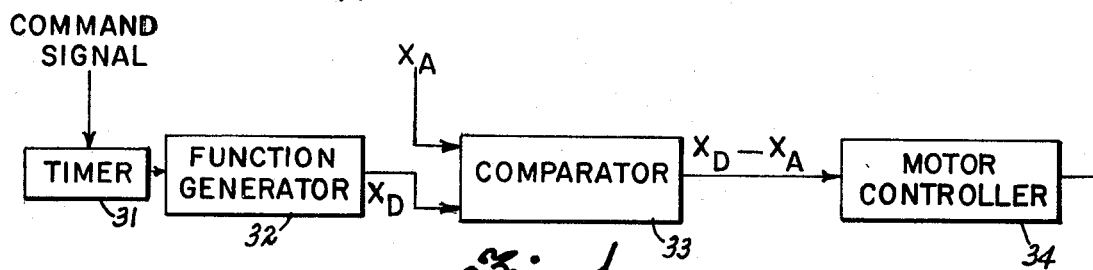

Referring now the the drawings and particularly to FIG. 1 thereof, there is shown a portion of the plastication system of an injection molding machine. The material to be plasticated is placed in a hopper 10 which is positioned above an aperture 11 in a cylindrical barrel 12 within which a plasticating screw 13 is rotatably and translatably positioned. Barrel 12 can include external heating means in the form of band heaters 14 to add heat to the material being plasticated. The forward end of barrel 12 includes a discharge orifice 15 which can also include a shut-off valve (not shown) to control the flow of the plasticated material from the barrel. Adjacent the forward end of barrel 12 is a pair of mold halves 16, 17 which together define a mold cavity 18 therebetween. A passageway 19 is provided between mold cavity 18 and the exterior surface of mold half 16 to permit the plasticated material to be injected into cavity 18. Passageway 19 is in alignment with discharge orifice 15 of barrel 12 to provide communication between the end of barrel 12 and mold cavity 18.

Screw 13 is driven by means of a motor 20 which drives a pinion 21 which is, in turn, in intermeshing relation with a gear 22 be keyed to the end of screw 13. Motor 20 can be either of the hydraulic or the electric type.

As screw 13 rotates and causes plasticated material to be transported forwardly in barrel 12 (to the right as shown in FIG. 1), the accumulation of the plasticated material at the forward end of the barrel forces screw 13 rearwardly until a point is reached at which the volume of plasticated material within the barrel and ahead of the screw is substantially equal to the volume of mold cavity 18. At that point motor 20 is stopped, thus stopping the rotation of screw 13, and hydraulic pressure is applied to a piston 23 attached to the rearmost portion 24 of screw 13 and slidably positioned within a cylinder 25. The hydraulic pressure, which can be applied through fitting 26, forces screw 13 forwardly again, thereby injecting the plasticated material into mold cavity 18 when the shut-off valve (not shown) at the forward end of barrel 12 is opened, whereupon the plastication cycle is repeated once again as the material in mold cavity 18 is permitted to cool and thereby solidify.

The axial position of screw 13 is indicated by a position transducer 27 which provides an output signal proportional to the axial displacement of the screw. Position transducer 27 is driven by a shaft 28 to which a gear 29 is keyed which, in turn, is in intermeshing relation with a circumferential gear 30 composed of a plurality of alternating ridges and grooves on the surface of screw 13. As screw 13 moves axially, gear 29 is caused to rotate, thus rotating shaft 28 and thereby influencing the output of position transducer 27. The alternating grooves and ridges of circumferential gear 30 are in parallel planes perpendicular to the longitudinal axis of screw 13 so that as the screw rotates without translation, shaft 28 is not rotated and thus position transducer 27 is not affected.

Position transducer 27 can be of several types as, for example, a shaft angle encoder of either the optical or magnetic type. Where the output signals is in the form of pulses, the number of which is a function of the axial displacement of the screw, and which are fed to a digital to analog converter (not shown) to transform the digital pulses to an analog output. Alternatively, position transducer 27 can be a synchro or resolver that provides a direct analog signal output which is fed to a detector to obtain a direct current signal proportional to shaft position.

As shown in FIG. 1, when motor 20 is started to initiate rotation of screw 13, a command signal is provided to a timer 31, which times the period within which motor 20 is in operation. A function generator 32 is provided to define a continuous curve representative of the desired screw axial displacement as a function plastication time. If desired, however, the curve generator can be replaced by a device which provides linear interpolation between a series of discrete input points representing screw displacements as a function of plastication time.

In operation, timer 31 supplies periodic pulses to function generator 32 and the latter provides a signal, $X_D$, representative of the desired axial screw displacement corresponding with that particular plastication time. Both the desired screw axial displacement, $X_D$, provided by function generator 32, and the actual screw axial displacement, $X_A$, provided by position transducer 27 are supplied to a comparator 33 which compares the two signals and generates an error signal, $X_D - X_A$, which is a function of the arithmetic difference between the two position signals. The error signal is supplied to a motor controller 34 which provides a signal to adjust the speed of motor 20, depending upon the direction and magnitude of the error signal provided thereto. When the desired shot size, $X_S$, is achieved comparator 33 furnishes a zero signal to motor controlled 34 which, in turn, stops motor 20 thereby stopping rotation of screw 13. The screw can then be hydraulically forced axially forwardly to thereby inject the plasticated material into mold cavity 18.

Figure 2:
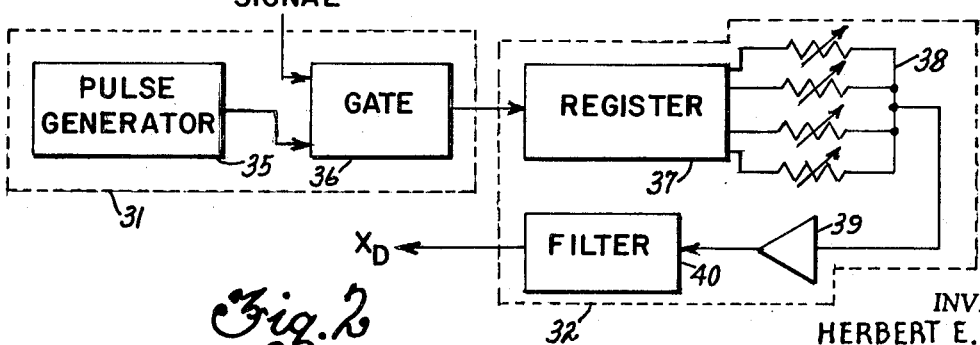
FIG. 2 is a block diagram showing one possible type of function generator to provide schedule of desired screw axial positions as a function of plastication time.

A suitable timer and function generator arrangement for providing continuous values of $X_D$ is shown in FIG. 2. Timer 31 comprises a pulse generator 35 and an AND gate 36. A command signal is impressed on gate 36 to provide an output signal from timer 31. The command signal can be furnished by a machine sequence controller (not shown) which provides the signal when plastication commences, or it can be provided from motor 20 when it is activated and begins to rotate screw 13.

The output from timer 31, which is a signal representative of plastication time, is provided to function generator 32 which provides an output signal representative of the desired screw displacement, $X_D$, corresponding to the plastication time provided it by timer 31. The function generator can comprise a register 37 to count the pulses provided by timer 31. A network of variable potentiometers 38 is provided to permit the setting of the desired screw displacements. The number of potentiometers provided corresponds with the desired number of increments into which the plastication time is divided. Although shown in FIG. 2 as having four potentiometers, function generator 32 can have as many potentiometers as desired to divide the plastication time into the desired number of increments. Thus, when register 37 counts a sufficient number of pulses to indicate, say, the second increment of time has been reached, a voltage is applied across the second potentiometers to provide a signal representing the desired screw displacement at that time. The latter signal is amplified in amplifier 39 and can then be passed through a filter 40 to smooth the output signal from amplifier 39 from one comprising a series of discontinuous steps to one of a substantially continuous nature.

Figure 3:
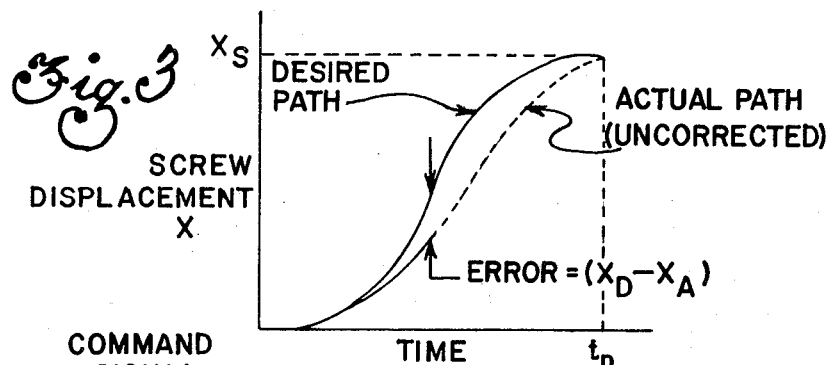
FIG. 3 is a graph showing the desired rate of travel of the screw as a function of screw axial position and plastication time and also shows the uncorrected path which the screw could follow and the error existing between the desired path and the uncorrected path.

As shown in FIG. 3, the screw axial position as a function of plastication time is indicated as the desired path and is the path to which the control system of the present invention will control the motion of the screw. If the screw position as a function of time follows a different path, such as the path designated as the actual path (uncorrected) which deviates from the desired path, the difference between the axial position corresponding to the desired path and that of the actual path for the time is determined in comparator 33 and the difference therebetween is designated the error signal and utilized to control the rotational speed of the motor to bring the system back to the desired schedule of the screw displacement as a function of time.

One way in which a hydraulically driven screw drive motor can be controlled is by means of a servo-valve. The error signal can be designated E and can be amplified in a suitable amplifier which provides a current output proportional to the error signal and which is supplied to a servo-valve (not shown) to control the flow of hydraulic fluid to motor 20. An example of a suitable servo-valve is an electrically operated flow control servo valve such as that disclosed in U.S. Pat. No. 3,023,782 granted on Mar. 6, 1962 to A.C. Haves, Jr. and D. I. Hall.

As hereinbefore stated, the schedule of screw axial positions versus plastication time can be defined by a series of points which are provided to a function generator which automatically fits a curve to those points. Alternatively, the control points can be provided to an interpolator which can be adapted to a linearly interpolate between the input points provided. In each case, the curve generator and interpolator both provide an output signal representative of the desired screw axial displacement corresponding to the time input signal provided by the timer. A suitable timer for this purpose provides periodic output pulses at predetermined intervals in order to provide corresponding outputs from the function generator at the same intervals to thereby permit continuous control of the screw rotational speed so that the screw axial retraction for any particular plastication time follows the predetermined schedule.

It can thus be seen that an improved automatic control system is provided to assure that the axial retraction of the screw in an injection molding machine follows a predetermined path as a function of plastication time. Such a system permits the adjustment of the plastication phase of the injection molding cycle to any desired conditions for the most efficient operation of the machine. Additionally, it provides a means for controlling the thermal history of the material being plasticated and thus finds particular utility in conjunction with the plastication of thermally degradable material.

While particular embodiments of the invention have been illustrated and described it will be apparent to those skilled in the art that various changes in modifications can be made without departing from the spirit and scope of the invention and it it intended to cover in the appended claims all such changes and modifications that within the scope of this invention.

What is claimed is:

1. In an injection molding machine including a plastication system for plasticating material to be molded, said plastication system comprising a substantially cylindrical barrel and feed screw rotatably and translatably positioned within said barrel, and means for rotating said screw, the improvement comprising:
   a. means for generating a signal proportional to the actual axial position of said screw within said barrel;
   b. means for providing a schedule of desired screw axial position as a function of plastication time;
   c. means for determining the desired screw axial position for a given plastication time;
   d. means for comparing the desired screw axial position with the actual screw axial position and for generating an error signal proportional thereto; and
   e. means responsive to the error signal to correct the speed of said rotating means so that said actual screw axial position corresponds substantially with said desired screw axial position.

2. The injecting molding machine of claim 1 including means for stopping said rotating means when said actual axial position of said screw corresponds with a predetermined maximum axial position of said screw.

3. The machine of claim 1 wherein the means for determining the actual screw axial position is a shaft angle encoder.

4. The machine of claim 1 wherein the means for determining the actual position is a resolver.

5. The machine of claim 1 wherein the means for providing the schedule of desired screw axial position as a function of plastication time includes a function generator to define a curve based on input quantities provided thereto.

* * * * *